(12) United States Patent
Josifovski

(10) Patent No.: US 7,590,605 B2
(45) Date of Patent: Sep. 15, 2009

(54) LATTICE MATCHING

(75) Inventor: Ljubomir Josifovski, Middlesex (GB)

(73) Assignee: Canon Kabushiki Kaisha, Tokyo (JP)

( * ) Notice: Subject to any disclaimer, the term of this patent is extended or adjusted under 35 U.S.C. 154(b) by 374 days.

(21) Appl. No.: 10/564,632

(22) PCT Filed: Jul. 16, 2004

(86) PCT No.: PCT/GB2004/003084

§ 371 (c)(1), (2), (4) Date: Jun. 26, 2006

(87) PCT Pub. No.: WO2005/008523

PCT Pub. Date: Jan. 27, 2005

(65) Prior Publication Data

US 2007/0038450 A1 Feb. 15, 2007

(30) Foreign Application Priority Data

Jul. 16, 2003 (GB) ................. 0316669.1

(51) Int. Cl.
*G06N 5/00* (2006.01)
*G10L 15/26* (2006.01)
*G06F 17/28* (2006.01)
*G06F 17/30* (2006.01)

(52) U.S. Cl. ............................ 706/29; 704/236; 707/3; 707/6

(58) Field of Classification Search .................. 706/29; 704/236; 707/3, 6
See application file for complete search history.

(56) References Cited

FOREIGN PATENT DOCUMENTS

WO    WO 01/31627    5/2001

OTHER PUBLICATIONS

Wang, Mandarin spoken document retrieval based on syllable lattice matching, 2000.*
Ng et al., Phonetic Recognition for Spoken Document Retrieval, 1998.*
D.A. James, et al., "A Fast Lattice-Based Approach to Vocabulary Independent Wordspotting", IEEE International Conference on Acoustics, Speech, and Signal Processing, vol. 1, pp. 377-380 (Apr. 22, 1994).
S.J. Young, et al., "Acoustic Indexing for Multimedia Retrieval and Browsing", IEEE International Conference on Acoustics, Speech, and Signal Processing, vol. 1, pp. 199-202 (Apr. 21, 1997).

* cited by examiner

*Primary Examiner*—David R Vincent
*Assistant Examiner*—Nathan H Brown, Jr.
(74) *Attorney, Agent, or Firm*—Fitzpatrick, Cella, Harper & Scinto

(57) ABSTRACT

A system is described for matching lattices such as phoneme lattices generated by an automatic speech recognition unit. The system can be used to retrieve files from a database by comparing a query lattice with annotation lattices associated with the data files that can be retrieved, and by retrieving the data files having an annotation lattice most similar to the query lattice.

31 Claims, 13 Drawing Sheets

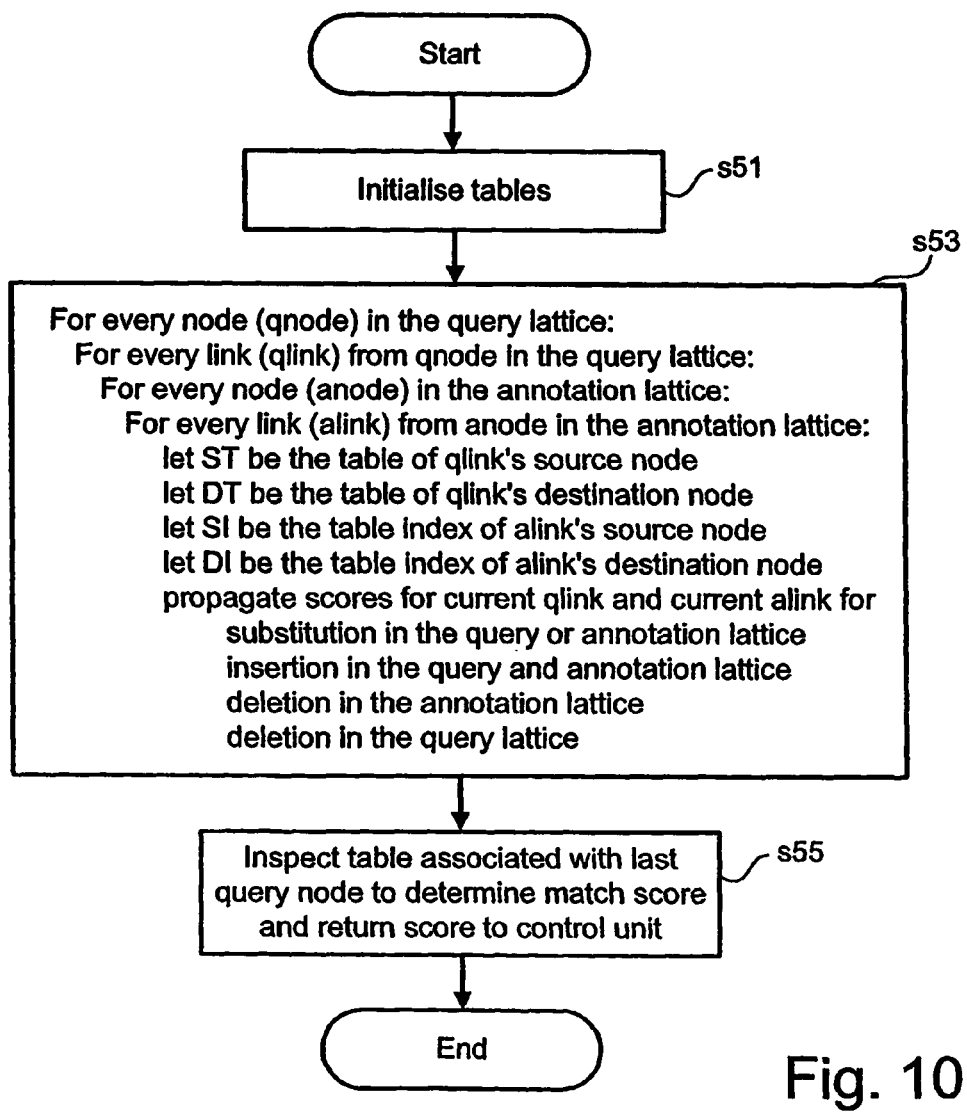

| INDEX | SCORE |
|---|---|
| 0 (0) | $S_0$ |
| 1 (6) | $S_1$ |
| 2 (10) | $S_2$ |
| 3 (15) | $S_3$ |
| 4 (23) | $S_4$ |
| 5 (28) | $S_5$ |
| 6 (33) | $S_6$ |

Fig. 9

Start

Initialise tables — s51 s53
For every node (qnode) in the query lattice:
  For every link (qlink) from qnode in the query lattice:
    For every node (anode) in the annotation lattice:
      For every link (alink) from anode in the annotation lattice:
        let ST be the table of qlink's source node
        let DT be the table of qlink's destination node
        let SI be the table index of alink's source node
        let DI be the table index of alink's destination node
        propagate scores for current qlink and current alink for
            substitution in the query or annotation lattice
            insertion in the query and annotation lattice
            deletion in the annotation lattice
            deletion in the query lattice Inspect table associated with last query node to determine match score and return score to control unit — s55

End

| INDEX | SCORE |       | SCORE  | INDEX |
|-------|-------|-------|--------|-------|
| 0 (0) | 0     |       | -1e+38 | 0 (0) |
| 1 (6) | 0     |       | -1e+38 | 1 (6) |
| 2 (10)| 0     |       | -1e+38 | 2 (10)|
| 3 (15)| 0     |       | -1e+38 | 3 (15)|
| 4 (23)| 0     |       | -1e+38 | 4 (23)|
| 5 (28)| 0     |       | -1e+38 | 5 (28)|
| 6 (33)| 0     |       | -1e+38 | 6 (33)|

DT[1] = MAX(DT[1], ST[0] + log(1) + log(0.6) + log(P(insert /ih/)) + log(P(insert /k/))) = a

| INDEX | SCORE |  | SCORE  | INDEX |
|-------|-------|--|--------|-------|
| 0 (0) | 0     |  | -1e+38 | 0 (0) |
| 1 (6) | 0     |  | a      | 1 (6) |
| 2 (10)| 0     |  | -1e+38 | 2 (10)|
| 3 (15)| 0     |  | -1e+38 | 3 (15)|
| 4 (23)| 0     |  | -1e+38 | 4 (23)|
| 5 (28)| 0     |  | -1e+38 | 5 (28)|
| 6 (33)| 0     |  | -1e+38 | 6 (33)|

Fig. 11c

DT[1] = MAX(DT[1], ST[0] + log(1) + log(0.6) + log(P(/ih/ sub with /k/))) = b

| INDEX | SCORE |  | SCORE  | INDEX |
|-------|-------|--|--------|-------|
| 0 (0) | 0     |  | -1e+38 | 0 (0) |
| 1 (6) | 0     |  | b      | 1 (6) |
| 2 (10)| 0     |  | -1e+38 | 2 (10)|
| 3 (15)| 0     |  | -1e+38 | 3 (15)|
| 4 (23)| 0     |  | -1e+38 | 4 (23)|
| 5 (28)| 0     |  | -1e+38 | 5 (28)|
| 6 (33)| 0     |  | -1e+38 | 6 (33)|

LATTICE MATCHING

The present invention relates to an apparatus and method for matching lattices, such as phoneme lattices. The invention can be used to search a database of data files having associated annotation lattices, in response to a user's input query. The input query may be a voiced or a typed query.

Databases of information are well known and suffer from the problem of how to locate and retrieve the desired information from the database quickly and efficiently. Existing database search tools allow the user to search the database using typed keywords. Whilst this is quick and efficient, this type of searching is not suitable for various kinds of databases, such as video or audio databases.

Various proposals have been made for spoken document retrieval systems which allow users to locate and retrieve the desired information from the database using a spoken query. The user's input query and the annotation are usually generated by an automatic speech recognition system which generates a lattice of phonemes defining the phoneme alternatives hypothesised by the automatic speech recognition unit for the query and the annotation. The retrieval operation then relies on a matching of the phonemes in the query lattice with the phonemes in the annotation lattices to identify the data file to be retrieved.

The applicant has proposed in their earlier international application WO01/31627 a technique for matching a query sequence of phonemes with one or more annotation sequences of phonemes. The technique uses dynamic programming to time align and match the phonemes in the query sequence with the phonemes in the annotation sequences. However, the technique proposed will only work with canonical sequences of phonemes and if lattices are to be matched then these must either be divided into the different possible phoneme sequences represented by the lattice or the lattice must be flattened and the dynamic programming constraints adjusted to take into account the phoneme alternatives.

According to one aspect, the present invention provides a lattice comparison apparatus and method comprising means for receiving first and second lattices of labels; means for comparing the first lattice with the second lattice by propagating a plurality of paths, each representing a comparison between labels in the first lattice and labels in the second lattice and each path having a score representing the similarity of the comparison; wherein during the path propagation, the comparing means is operable to define a plurality of storage areas, each storage area being associated with a first lattice node and a respective node in the second lattice and each being operable to store an accumulative value representing the closeness of the comparison between the labels in the first lattice up to the associated lattice node and labels in the second lattice up to the associated second lattice node.

According to another aspect, the present invention also provides an apparatus and method for searching a database comprising a plurality of information entries to identify information to be retrieved therefrom, wherein each of the information entries has an associated annotation lattice and wherein the apparatus includes the above lattice comparison apparatus for comparing a query lattice representing an input query with each of the annotation lattices.

According to another aspect, the present invention provides a lattice comparison apparatus and method in which first and second lattices are compared by propagating a plurality of paths, each representing a comparison between labels in the first lattice and labels in the second lattice to identify the end of one or more portions in the second lattice corresponding to the first lattice, wherein the sequence length of the first lattice is known and used to identify an approximate start of the identified one or more portions in the second lattice corresponding to the first lattice.

Exemplary embodiments of the present invention will now be described with reference to the accompanying drawings in which:

FIG. 9 shows a table of scores which is kept for each node within the query lattice during the matching of the query lattice with an annotation lattice;

FIG. 10 is a flow chart illustrating the main processing steps involved in comparing the query lattice with the annotation lattice;

FIG. 11a shows a source table and a destination table which are updated during the comparison of the query lattice with the annotation lattice;

FIG. 11b illustrates the updating of the destination table to account for the insertion of phonemes in the query lattice and the annotation lattice;

FIG. 11c illustrates the updating of the destination table for a phoneme substitution in the annotation;

Embodiments of the present invention can be implemented using dedicated hardware circuits, but the embodiment to be described is implemented in computer software or code, which is run in conjunction with processing hardware such as a personal computer, workstation, photocopier, facsimile machine, personal digital assistant (PDA), cellular telephone or the like.

Data File Annotation

Figure 1:
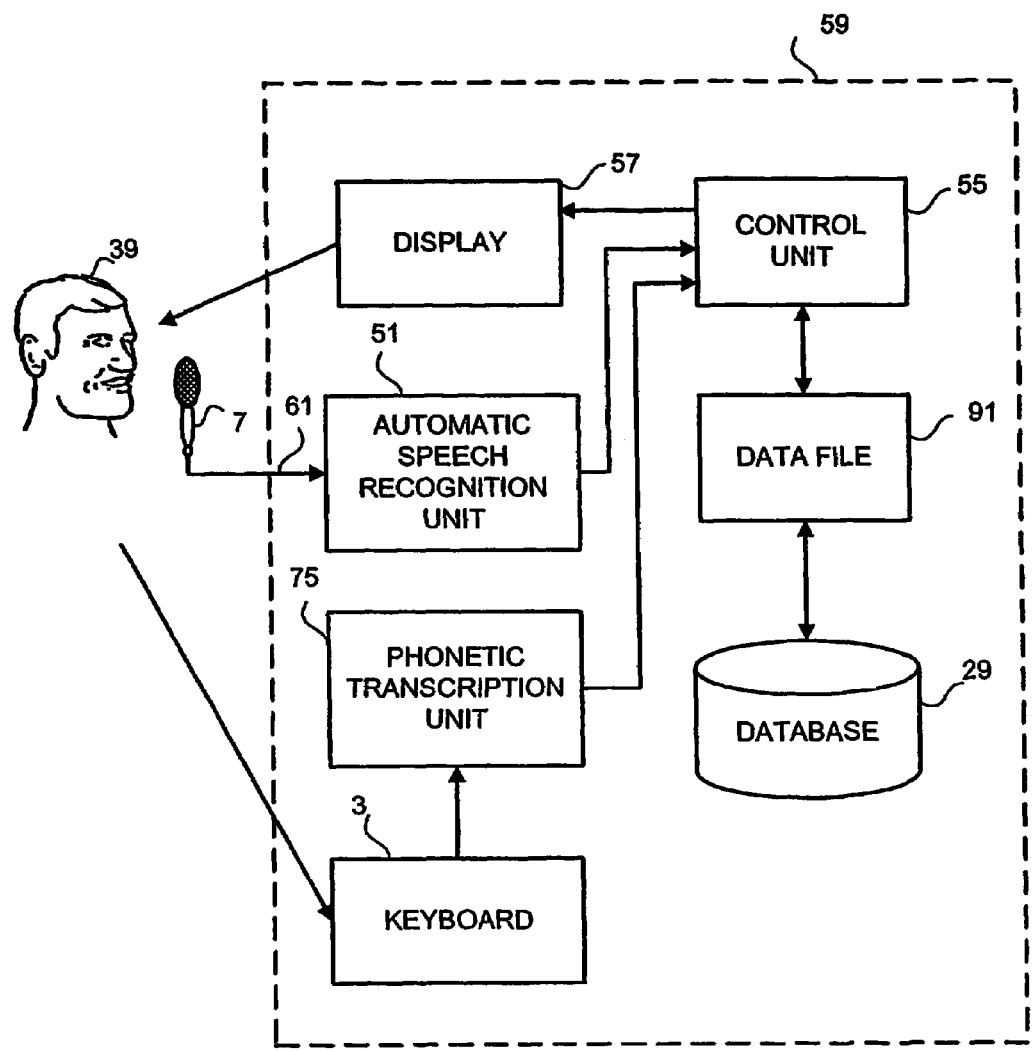
FIG. 1 is a schematic block diagram illustrating a user terminal which allows the annotation of a data file with annotation data generated from a typed or voiced annotation.
Figure 2:
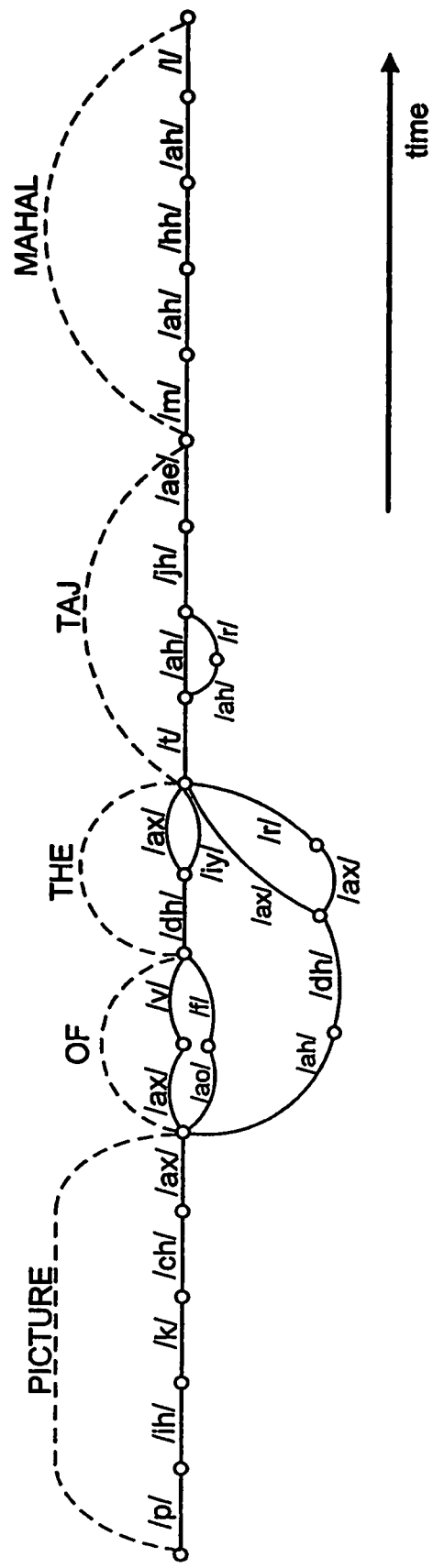
FIG. 2 is a schematic diagram of phoneme and word lattice annotation data which is generated from a typed input by the user for annotating the data file.

FIG. 1 illustrates the form of a user terminal 59 which allows a user to input typed or voiced annotation data via the keyboard 3 and microphone 7 for annotating a data file 91 which is to be stored in a database 29. In this embodiment, the data file 91 comprises a two dimensional image generated by, for example, a camera. The user terminal 59 allows the user 39 to annotate the 2D image with an appropriate annotation which can be used subsequently for retrieving the 2D image from the database 29. In this embodiment, a typed input is converted, by the phonetic transcription unit 75, into phoneme (or phoneme-like) and word lattice annotation data which is passed to the control unit 55. FIG. 2 illustrates the form of the phoneme and word lattice annotation data generated for the typed input "picture of the Taj Mahal". As shown in FIG. 2, the phoneme and word lattice is an acyclic directed graph with a single entry point and a single exit point. It represents different parses of the user's input. As shown, the phonetic transcription unit 75 identifies a number of different possible phoneme strings which correspond to the typed input, from an internal phonetic dictionary (not shown).

Figure 3:
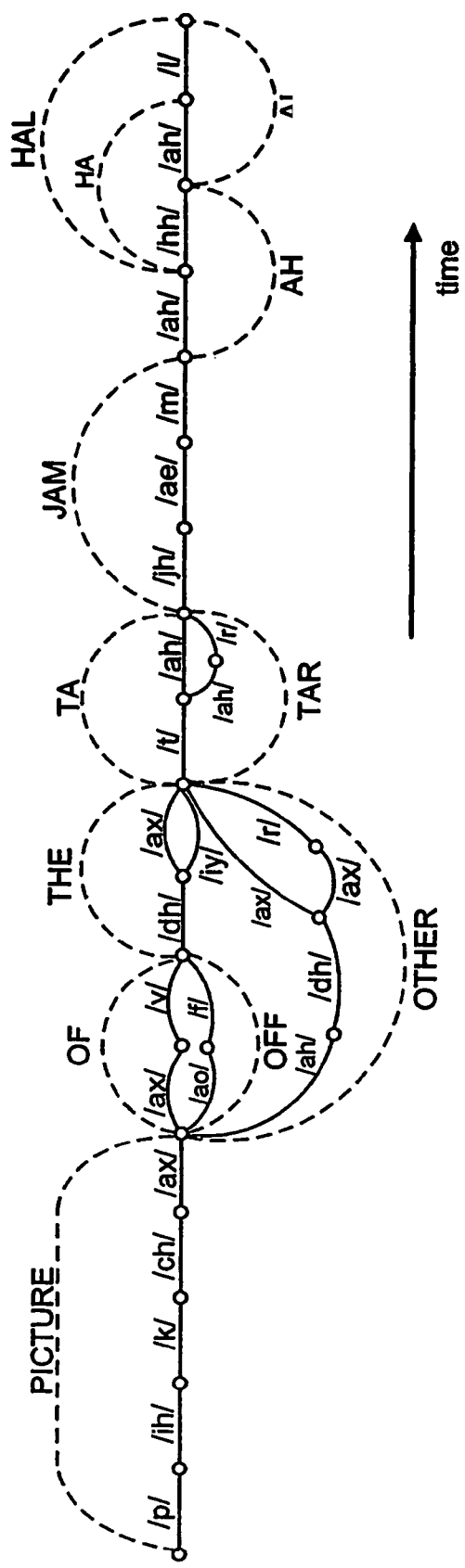
FIG. 3 is a schematic diagram of phoneme and word lattice annotation data which is generated from a voiced input by the user for annotating the data file.

Similarly, a voiced input is converted by the automatic speech recognition unit 51 into phoneme (or phoneme-like) and word lattice annotation data which is also passed to the control unit 55. The automatic speech recognition unit 51 generates this phoneme and word lattice annotation data by (i) generating a phoneme lattice for the input utterance; (ii) then identifying words within the phoneme lattice; and (iii) finally by combining the two. FIG. 3 illustrates the form of the phoneme and word lattice annotation data generated for the input utterance "picture of the Taj Mahal". As shown, the automatic speech recognition unit identifies a number of different possible phoneme strings which correspond to this input utterance. As shown in FIG. 3, the words which the automatic speech recognition unit 51 identifies within the phoneme lattice are incorporated into the phoneme lattice data structure. As shown for the example phrase given above, the automatic speech recognition unit 51 identifies the words "picture", "of", "off", "the", "other", "ta", "tar", "jam", "ah", "hal", "ha" and "al".

As shown in FIG. 3, the phoneme and word lattice generated by the automatic speech recognition unit 51 is an acyclic directed graph with a single entry point and a single exit point. It represents different parses of the user's input annotation utterance. It is not simply a sequence of words with alternatives, since each word does not have to be replaced by a single alternative, one word can be substituted for two or more words or phonemes, and the whole structure can form a substitution for one or more words or phonemes. Therefore, the density of the data within the phoneme and word lattice annotation data essentially remains linear throughout the annotation data, rather than growing exponentially as in the case of a system which generates the N-best word lists for the audio annotation input.

In this embodiment, the annotation data generated by the automatic speech recognition unit 51 or the phonetic transcription unit 75 has the following general form:

HEADER
  flag if word if phoneme if mixed
  time index associating the location of blocks of annotation data within memory to a given time point.
  word set used (i.e. the dictionary)
  phoneme set used
  the language to which the vocabulary pertains
  phoneme probability data
  Block(i) i=0,1,2, ...
    node $N_j$ j=0,1,2, ...
      time offset of node from start of block
      phoneme links (k) k=0,1,2, ... offset to node $N_j=N_k-N_j$ ($N_k$ is node to which link K extends) phoneme associated with link (k) phoneme confidence
      word links (l) l=0,1,2, ... offset to node $N_j=N_l-N_j$ ($N_j$ is node to which link l extends) word associated with link (l) word confidence The flag identifying if the annotation data is word annotation data, phoneme annotation data or if it is mixed is provided since not all the data files within the database will include the combined phoneme and word lattice annotation data discussed above, and in this case, a different search strategy would be used to search this annotation data.

In this embodiment, the annotation data is divided into blocks of nodes in order to reduce the storage space required to store the annotation data and to facilitate the search to jump into the middle of the annotation data for a given search. The header therefore includes a time index which associates the location of the blocks of annotation data within the memory to a given time offset between the time of start and the time corresponding to the block (eg the time corresponding to the beginning of the block).

The header also includes data defining the word set used (i.e. the dictionary), the phoneme set used and their probabilities and the language to which the vocabulary pertains. The header may also include details of the automatic speech recognition system used to generate the annotation data and any appropriate settings thereof which were used during the generation of the annotation data.

The blocks of annotation data then follow the header and identify, for each node in the block, the time offset of the node from the start of the block, the phoneme links which connect that node to other nodes by phonemes and word links which connect that node to other nodes by words. Each phoneme link and word link identifies the phoneme or word which is associated with the link and the offset to the current node. For example, if node $N_{50}$ is linked to node $N_{55}$ by a phoneme link, then the offset to node $N_{50}$ is 5. As those skilled in the art will appreciate, using an offset indication like this allows the division of the continuous annotation data into separate blocks. Additionally, in this embodiment, each phoneme and word link includes a confidence weighting output by the speech recognition system for the corresponding phoneme or word, indicating the level of confidence that the recognition system has in the phoneme or word. Although not used in this embodiment, node weightings may also be used which is indicative of the confidence of arriving at the node.

In this embodiment, after the user has input the annotation, the control unit 55 retrieves the appropriate 2D image file from the database 29 and appends the generated phoneme and word annotation data to the data file 91. Alternatively, the annotation data can be stored separately from the data file 91 with an appropriate pointer to the associated data file 91. The augmented data file is then returned to the database 29. During this annotating step, the control unit 55 is operable to display the 2D image on the display 57, so that the user can ensure that the annotation data is associated with the correct data file 91.

As will be explained in more detail below, the use of such phoneme and word lattice annotation data allows a quick and efficient search of the database 29 to be carried out, to identify and to retrieve a desired 2D image data file stored therein. This can be achieved by firstly searching in the database 29 using the word data and, if this search fails to provide the required data file, then performing a further search using the more robust phoneme data. As those skilled in the art of speech recognition will realise, use of phoneme data is more robust because phonemes are dictionary independent and allow the system to cope with out of vocabulary words, such as names, places, foreign words etc. Use of phoneme data is also capable of making the system future-proof, since it allows data files which are placed into the database 29 to be retrieved when the original annotation was input by voice and the original automatic speech recognition system did not understand the words of the input annotation.

Data File Retrieval

Figure 4:
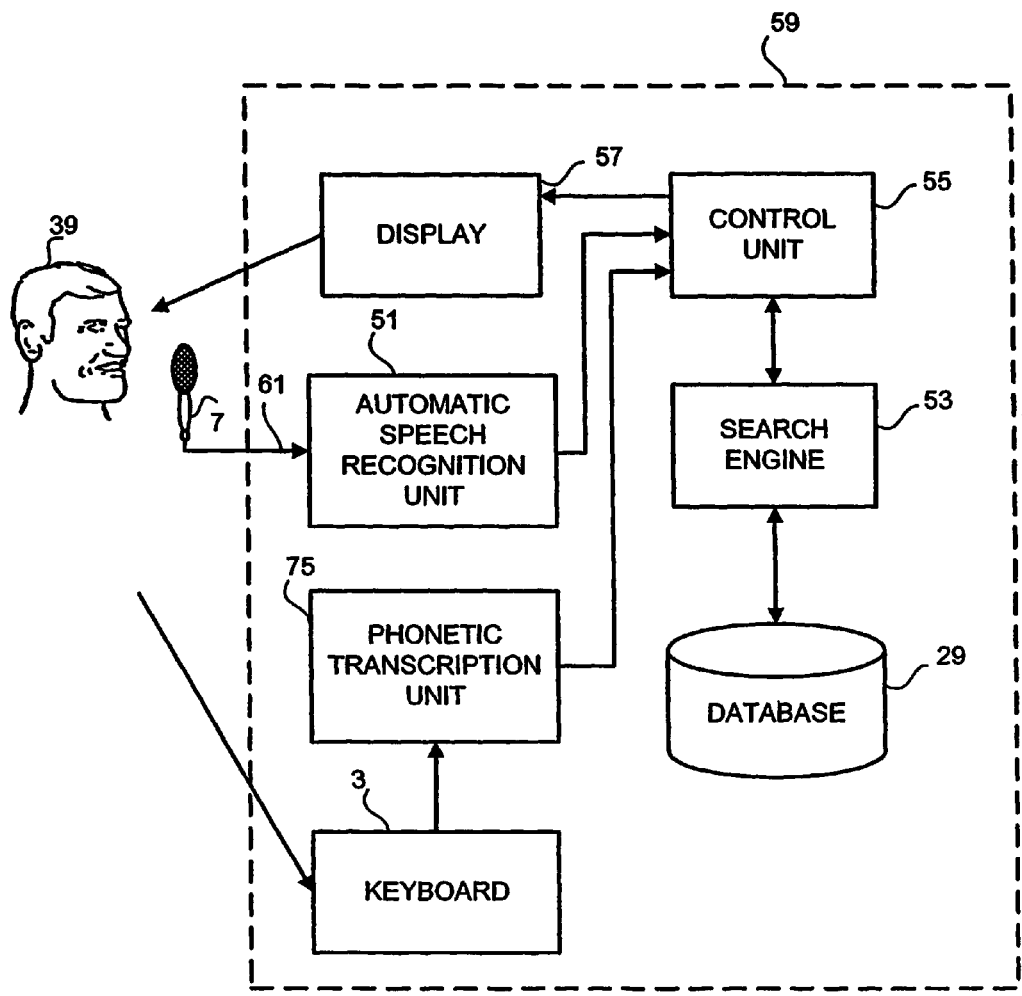
FIG. 4 is a schematic block diagram of a user's terminal which allows the user to retrieve information from the database by a typed or voice query.

FIG. 4 is a block diagram illustrating the form of a user terminal 59 which is used, in this embodiment, to retrieve the annotated 2D images from the database 29. This user terminal 59 may be, for example, a personal computer, a hand-held device or the like. As shown, in this embodiment, the user terminal 59 comprises the database 29 of annotated 2D images, an automatic speech recognition unit 51, a phonetic transcription unit 75, a keyboard 3, a microphone 7, a search engine 53, a control unit 55 and a display 57. In operation, the user inputs either a voice query via the microphone 7 or a typed query via the keyboard 3 and the query is processed either by the automatic speech recognition unit 51 or by the phonetic transcription unit 75, to generate corresponding phoneme and word data. In this embodiment, this data also takes the form of a phoneme and word lattice, but this is not essential. This query phoneme and word data is then input to the control unit 55 which is operable to initiate an appropriate search of the database 29 using the search engine 53. The results of the search, generated by the search engine 53, are then transmitted back to the control unit 55 which analyses the search results and generates and displays appropriate display data (such as the retrieved 2D image) to the user via the display 57.

Figure 5A:
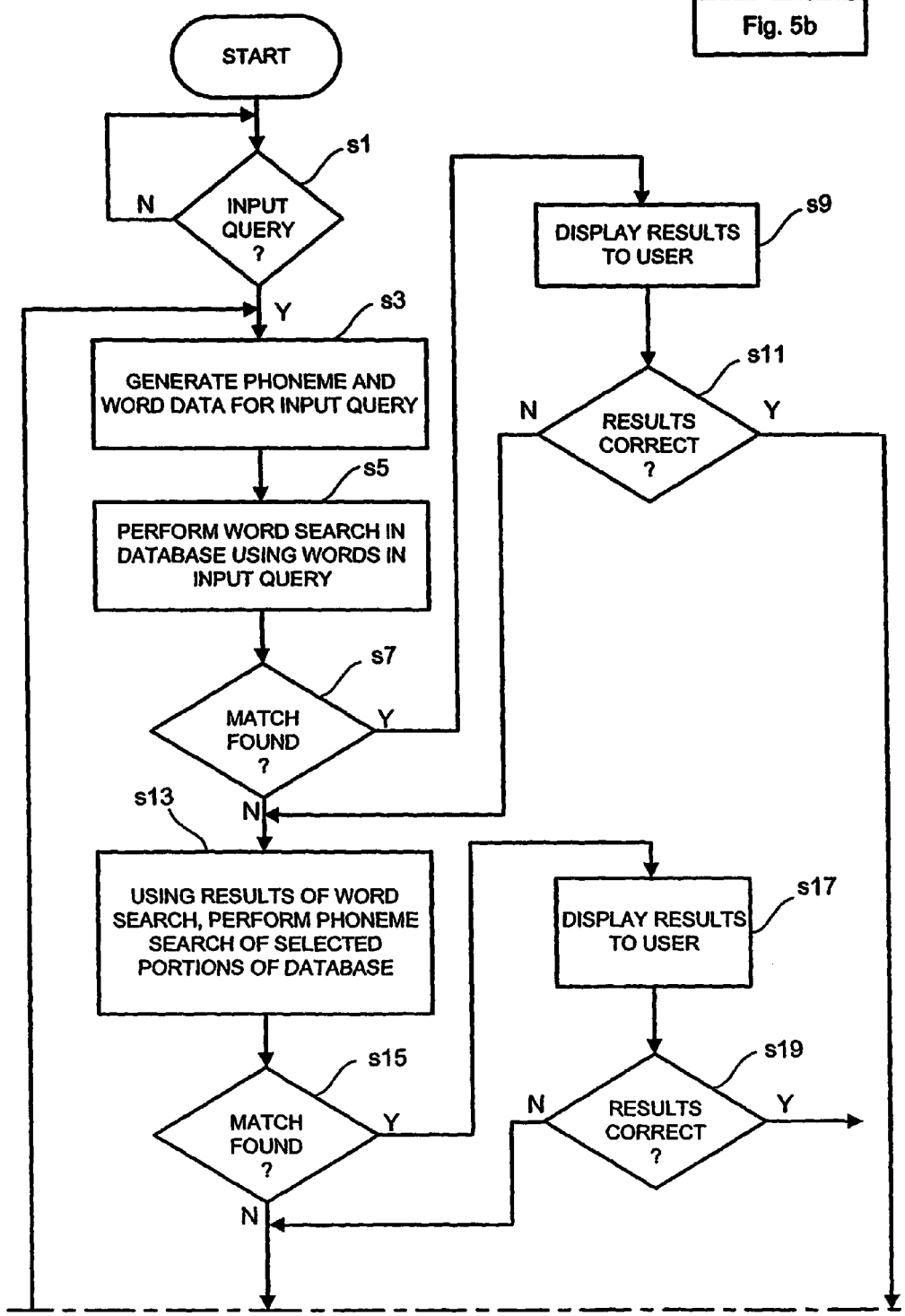
FIG. 5a is a flow diagram illustrating part of the flow control of the user terminal shown in FIG. 4.
Figure 5B:
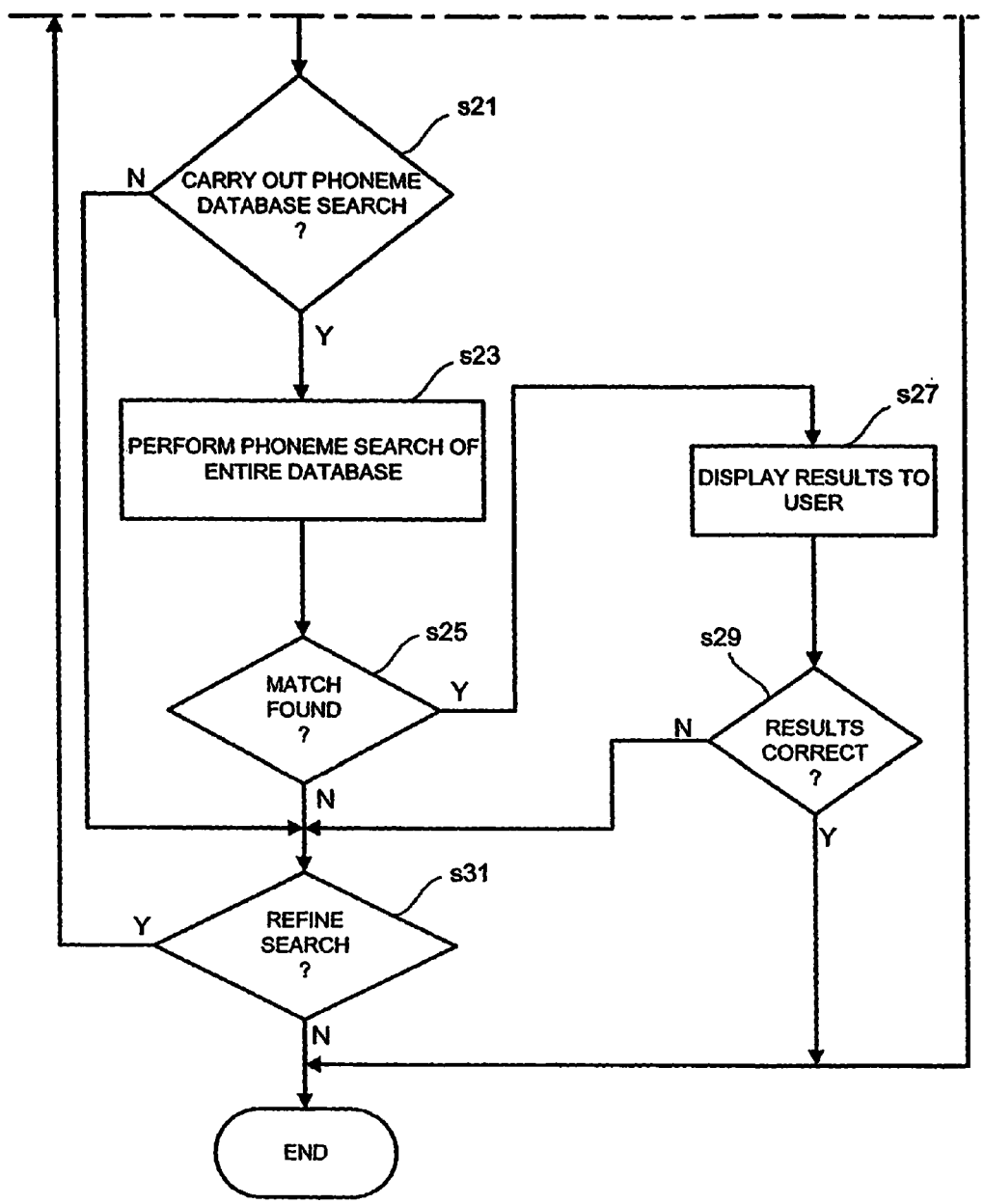
FIG. 5b is a flow diagram illustrating the remaining part of the flow control of the user terminal shown in FIG. 4.

FIGS. 5*a* and 5*b* are flow diagrams which illustrate the way in which the user terminal 59 operates in this embodiment. In step s1, the user terminal 59 is in an idle state and awaits an input query from the user 39. Upon receipt of an input query, the phoneme and word data for the input query is generated in step s3 by the automatic speech recognition unit 51 or the phonetic transcription unit 75. The control unit 55 then instructs the search engine 53, in step s5, to perform a search in the database 29 using the word data generated from the input query. The word search employed in this embodiment is the same as is currently being used in the art for typed word searches, and will not be described in more detail here. If in step s7, the control unit 55 identifies from the search results, that a match for the user's input query has been found, then it outputs the search results to the user via the display 57.

In this embodiment, the user terminal 59 then allows the user to consider the search results and awaits the user's confirmation as to whether or not the results correspond to the information the user requires. If they are, then the processing proceeds from step s11 to the end of the processing and the user terminal 59 returns to its idle state and awaits the next input query. If, however, the user indicates (by, for example, inputting an appropriate voice command) that the search results do not correspond to the desired information, then the processing proceeds from step s11 to step s13, where the search engine 53 performs a phoneme search of the database 29. However, in this embodiment, the phoneme search performed in step s13 is not of the whole database 29, since this could take several hours depending on the size of the database.

Instead, the phoneme search performed in step s13 uses the results of the word search performed in step s5 to identify one or more portions within the database which may correspond to the user's input query. For example, if the query comprises three words and the word search only identifies one or two of the query words in the annotation, then it performs a phoneme search of the portions of the annotations surrounding the identified word or words. The way in which the phoneme search performed in step s13 is carried out in this embodiment will be described in more detail later.

After the phoneme search has been performed, the control unit 55 identifies, in step s15, if a match has been found. If a match has been found, then the processing proceeds to step s17 where the control unit 55 causes the search results to be displayed to the user on the display 57. Again, the system then awaits the user's confirmation as to whether or not the search results correspond to the desired information. If the results are correct, then the processing passes from step s19 to the end and the user terminal 59 returns to its idle state and awaits the next input query. If however, the user indicates that the search results do not correspond to the desired information, then the processing proceeds from step s19 to step s21, where the control unit 55 is operable to ask the user, via the display 57, whether or not a phoneme search should be performed of the whole database 29. If in response to this query, the user indicates that such a search should be performed, then the processing proceeds to step s23 where the search engine performs a phoneme search of the entire database 29.

On completion of this search, the control unit 55 identifies, in step s25, whether or not a match for the user's input query has been found. If a match is found, then the processing proceeds to step s27 where the control unit 55 causes the search results to be displayed to the user on the display 57. If the search results are correct, then the processing proceeds from step s29 to the end of the processing and the user terminal 59 returns to its idle state and awaits the next input query. If, on the other hand, the user indicates that the search results still do not correspond to the desired information, then the processing passes to step s31 where the control unit 55 queries the user, via the display 57, whether or not the user wishes to redefine or amend the search query. If the user does wish to redefine or amend the search query, then the processing returns to step s3 where the user's subsequent input query is processed in a similar manner. If the search is not to be redefined or amended, then the search results and the user's initial input query are discarded and the user terminal 59 returns to its idle state and awaits the next input query.

A general description has been given above of the way in which a search is carried out in this embodiment by the user terminal 59. A more detailed description will now be given of the way in which the search engine 53 carries out the above mentioned phoneme searches.

Phoneme Lattice Search

As those skilled in the art will appreciate from the description of FIGS. 4 and 5, in this embodiment, the annotation phoneme data and the query phoneme data may both be derived either from text or from speech. Therefore, there are four situations to consider:

i) both the annotation and the query are generated from text;
ii) the annotation is generated from text and the query is generated from speech;
iii) the annotation is generated from speech and the query is generated from text; and
iv) both the query and annotation are generated from speech.

In this embodiment, the search engine 53 uses a dynamic programming comparison technique which allows for the insertion and deletion of phonemes from the query and/or the annotation, during the comparison of the query phoneme lattice with the annotation phoneme lattice. However, in the first situation when both the query and the annotation are generated from text, there is in general no need to consider insertion and deletions and the search engine compares the query with the annotation using a simple boolean comparison of the query text and the annotation text. In the second situation, the annotation is taken to be correct and the search engine 53 allows for the insertion and deletion of phonemes in the query in order to find the best alignment between the two. The third situation mentioned above is similar to the second situation except the sequence of query phonemes is taken to be correct and the search engine only allows for the insertion and deletion of phonemes in the annotation relative to the query. Finally, in the fourth situation, when both the annotation and the query are generated from speech, both phoneme lattices can have insertions and deletions.

As those skilled in the art will appreciate, the second and third situations mentioned above can be treated as a simplified form of the fourth situation since text can be treated as a simplified lattice with no or few alternatives. The following description will therefore concentrate on the fourth situation discussed above where the query phoneme lattice must be compared with the annotation phoneme lattices.

As discussed above with reference to FIG. 5, there are two different types of phoneme searches which can be carried out. The first is when the results from the word search are used to identify portions of the annotations against which a part of the query lattice is to be matched. The second is when the entire query is to be compared with different parts of the different annotations in order to identify the annotations that contain (in one or more places) the query. As will be described in more detail below, the following lattice matching technique can be used in both cases to yield the appropriate comparison result.

Figure 6:
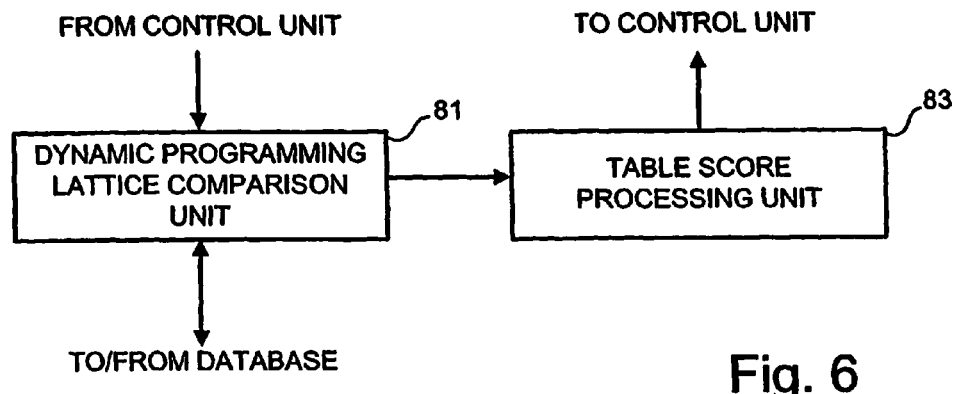
FIG. 6 is a block diagram illustrating part of the components of a search engine forming part of the user terminal shown in FIG. 4.

FIG. 6 is a block diagram illustrating the main components forming part of the search engine 53 shown in FIG. 4 that are used, in this embodiment, to perform the phoneme searches. As shown, the search engine 53 includes a dynamic programming (DP) lattice comparison unit 81 and a table score processing unit 83. The DP lattice comparison unit 81 receives the query phoneme lattice from the control unit 55 which it compares using a dynamic programming technique with a current annotation lattice retrieved from the database 29. The result of this comparison is a table of scores representing the similarity of the query lattice with the annotation lattice for different ending points in the annotation lattice. The table of scores is then passed to the table score processing unit 83 which processes the scores in the table to identify a score representing the similarity between the query lattice and the annotation lattice which it returns to the control unit 55. A more detailed discussion of the operation of the DP lattice comparison unit 81 and the table score processing unit 83 will now be given with reference to FIGS. 7 to 12.

Figure 7:
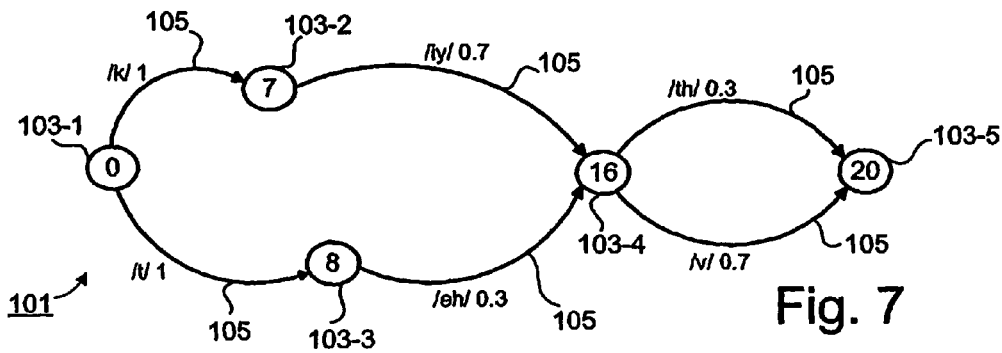
FIG. 7 is a schematic diagram of a query phoneme lattice.

FIG. 7 illustrates an example query phoneme lattice 101 having five nodes 103-1 to 103-5, each of which represents a point in time at which a phoneme begins or ends within the query. This timing information is represented by the number contained within the node 103. As shown in FIG. 7, the nodes 103 are connected together by one or more phoneme links 105 which identify the phoneme (and it's probability of occurring) that was recognised as being uttered between the corresponding two node time points.

Figure 8:
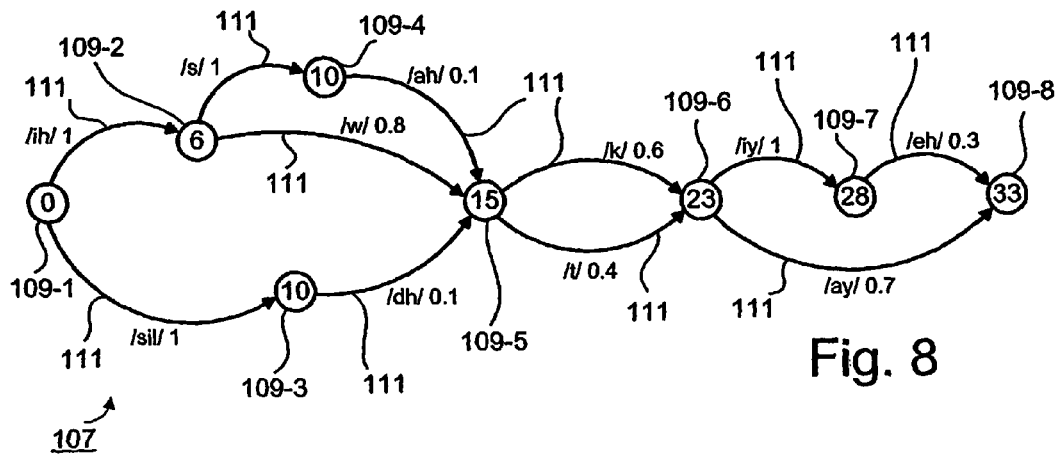
FIG. 8 is a schematic diagram of an annotation phoneme lattice.

FIG. 8 schematically illustrates an annotation phoneme lattice 107 which has a similar form to the query phoneme lattice 101 except that it is usually longer. As shown, the annotation phoneme lattice 107 includes a number of nodes 109-1 to 109-8 each representing a time point within the annotation at which a phoneme begins or ends. As with the query phoneme lattice 101, the annotation phoneme lattice 107 identifies the time points that are associated with the nodes by the numbers within the nodes 109. The annotation phoneme lattice 107 also has phoneme links connecting the nodes 109 in the lattice, with each phoneme link having an associated phoneme and probability of occurrence.

The DP lattice comparison unit 81 compares the phonemes in the phoneme lattice 101 with the phonemes in the annotation lattice 107 to determine a score representing the similarity between the two phoneme lattices. It does this by simultaneously propagating a plurality of dynamic programming paths, each of which represents a possible matching between part of the query lattice 101 and part of the annotation lattice 107. During the propagation, the scores associated with the dynamic programming paths are compared and only the paths having the best scores are propagated further. However, in the general case since the query lattice 101 may be matched with any part of the annotation lattice 107, the comparison can only be made on dynamic programming paths which have seen the same part of the annotation lattice 107.

In order to simplify the comparison, in this embodiment, all of the possible dynamic programming paths have the same start time which is fixed to the first time point (node) in the query lattice. Therefore, all of the dynamic programming paths which end at the same time point (node) in the annotation lattice 107 can be compared (and all but the best discarded) during the dynamic programming path propagation. The result of this simplification is that at the end of the comparison, the start time of the best match will not be known. However, since the approximate duration of the query is known and since the end time of the best match will be known, the duration of the query can be used to derive an approximate start time of the match within the annotation lattice 107. This simplification significantly speeds up the comparison process, as the number of dynamic programming paths that are tracked is an order of magnitude smaller than without this simplification.

In order to keep track of all the different dynamic programming paths, each node in the query phoneme lattice 101 has a table of scores associated with it. The table has as many entries as there are distinct time points in the annotation phoneme lattice. The table used for the annotation shown in FIG. 8 is shown in FIG. 9 and is referenced by reference numeral 121. As shown, the table 121 has seven entries which are indexed "0" through to "6". Each of the indices corresponds to one of the time points in the annotation lattice 107. Since there are two nodes (109-3 and 109-4) which correspond to the same time point, there is one less entry in the table 121 than there are nodes in the annotation lattice 107. The $i^{th}$ element in the table for query node j stores the score for the dynamic programming path ending at the $j^{th}$ node in the query lattice 101 and at the $i^{th}$ time point in the annotation lattice 107, which score represents the cumulative score for the match between the portion of the query ending at node j and the portion of the annotation ending at the $i^{th}$ time point.

During the DP comparison, the DP lattice comparison unit 81 propagates the paths in accordance with the phoneme links leaving the appropriate query and annotation nodes and updates the appropriate scores in the node tables 121. When propagating the scores over a phoneme link in the query lattice 101 and the annotation lattice 107, the lattice comparison unit 81 considers the following possibilities:

i) that both the query phoneme and the annotation phoneme were inserted;
 ii) that the annotation phoneme was substituted by the query phoneme in the query;
 iii) that the query phoneme was substituted by the annotation phoneme in the annotation;

iv) that the query phoneme was deleted from the annotation; and that v) the annotation phoneme was deleted from the query.

In order to apply different scores to these different possibilities, the dynamic programming comparison unit 81 has pre-stored insertion, deletion and substitution (decoding) probabilities for all of the phonemes known to the system (referred to below as confusion statistics). These probabilities are determined in advance during a training routine in which a large amount of known speech is processed. The way in which these pre-stored probabilities are determined will be described later. In addition to using these pre-stored probabilities, the DP comparison unit 81 uses the probability associated with each of the phonemes in the phoneme lattices 101 and 107. Therefore, in this embodiment, the DP lattice comparison unit 81 calculates the following score updates for the above five possibilities when comparing query phoneme W having probability X with annotation phoneme Y having probability Z:

$$\log(X) + \log(Z) + \log[P(W \text{ inserted})] + \log[P(Y \text{ inserted})] \quad (1)$$

$$\log(X) + \log(Z) + \log[P(Y \text{ substituted by } W)] \quad (2)$$

$$\log(X) + \log(Z) + \log[P(W \text{ substituted by } Y)] \quad (3)$$

$$\log(Z) + \log[P(W \text{ deleted})] \quad (4)$$

$$\log(X) + \log[P(Y \text{ deleted})] \quad (5)$$

However, before the scores can be propagated during the dynamic programming comparison, the node tables 121 must be initialised. In this embodiment, log scores are used and therefore, the entries in all of the node tables 121 except the node table 121-1 for the first query node 103-1 are set to the value $-1 \times 10^{38}$, to ensure that these scores will not win any comparison during the path propagation; and the entries in the node table 121-1 associated with the first node 103-1 of the query are initialised to zero. This initialisation of the node tables 121 is performed in step s51 shown in the flow chart of FIG. 10.

As shown in step s53, the dynamic programming lattice comparison unit 81 then processes each of the nodes 103 in the query lattice 101 in turn starting with the first query node 103-1.

The processing carried out in step s53 will now be described with reference to FIG. 11 for the /k/ phoneme link in the query lattice 101 extending between query node 103-1 and query node 103-2 and the /ih/ phoneme link in the annotation lattice 107 extending between annotation nodes 109-1 and 109-2. As shown in step s53, the DP lattice comparison unit 81 defines the node table 121 associated with source query node 103-1 to be the source table (ST) and defines the node table 121 associated with the destination query node 103-2 to be the destination table (DT). The DP lattice comparison unit 81 also defines the source index value (SI) as the node table index value corresponding to the source annotation node 109-1 and defines the destination index value (DI) as the node table index value corresponding to the destination annotation node 109-2. Therefore, for the current query and annotation links (representing phonemes /k/ and /ih/ respectively) being considered in this example, SI has the value "0" and DI has the value "1". The DP lattice comparison unit 81 then considers each of the five possibilities discussed above and updates the appropriate entries in the source and destination tables.

FIG. 11*a* shows the source table 121-ST and the destination table 121-DT. As discussed above, for the current phonemes being considered, the source table is the node table 121-1 corresponding to the first query node 103-1, and therefore it's entries will all initially be set to "zero"; and the destination table is the node table 121-1 corresponding to the second query node 103-2, and therefore it's entries will initially be set at $-1 \times 10^{38}$.

As discussed above, the first possibility that the DP lattice comparison unit 81 considers is that both the current query phoneme (/k/) and the current annotation phoneme (/ih/) have been inserted into the respective lattices. In this case, the DP lattice comparison unit 81 calculates the score update given in equation (1) above and accumulates this with the score in the source table pointed to by the source index value (SI). This updated score is then propagated by comparing it with the existing score in the destination table indexed by the current destination index value (DI). If the updated score propagated from the source table is greater than the appropriate score in the destination table, then the score in the destination table is replaced with the updated score. This calculation (performed by the lattice comparison unit 81) is shown in FIG. 11*b*, where DT[1] is the score in the destination table pointed to by the current destination index value (DI) and ST[0] is the score in the source table pointed to by the current source index value (SI). As illustrated in FIG. 11*b*, the result of the updating and comparison (a) is then written into the appropriate entry in the destination table 121-DT.

The DP lattice comparison unit 81 then considers the possibility that the current annotation phoneme was substituted by the current query phoneme in the query. It does this by calculating the score update given in equation (2) above and accumulating that update with the score from the source table pointed to by the source index value. This updated score is then again propagated by comparing it with the score in the destination table pointed to by the destination index value, and overwriting that score if the updated score is greater. The calculation performed in this case is shown in FIG. 11*c* which also illustrates the entries in the source and destination tables which are updated and compared.

Figure 11D:
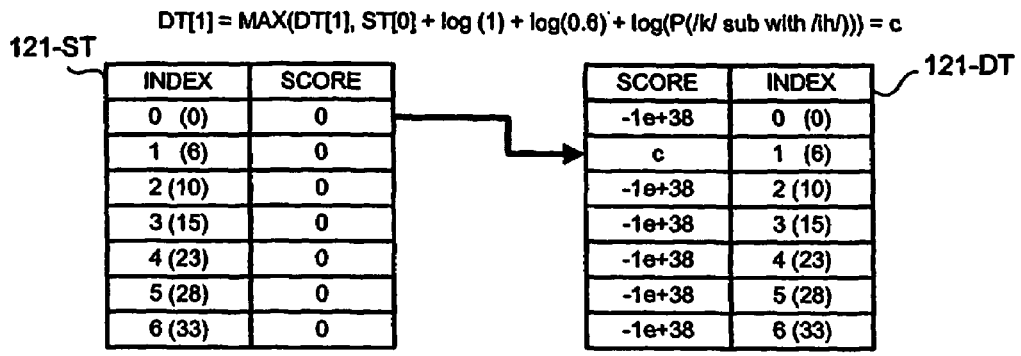
FIG. 11d illustrates the updating of the destination table for a phoneme substitution in the query.

The DP lattice comparison unit 81 then considers the possibility that the current query phoneme was substituted by the current annotation phoneme in the annotation. It does this by calculating the score update given in equation (3) above and accumulating that update with the score from the source table pointed to by the source index value. This updated score is then again propagated by comparing it with the score in the destination table pointed to by the destination index value, and overwriting that score if the updated score is greater. The calculation performed by the DP lattice comparison unit 81 in this case is shown in FIG. 11*d* which also illustrates the entries in the source and destination tables which are updated and compared.

Figure 11E:
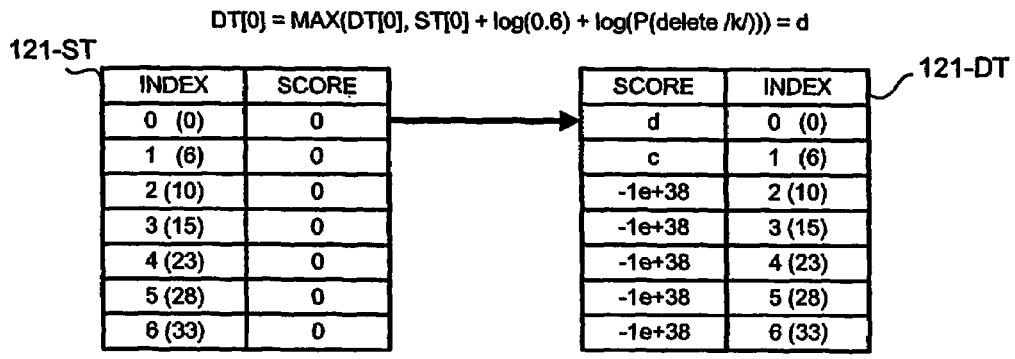
FIG. 11e illustrates the updating of the destination table to account for the deletion of a phoneme from the annotation.

The DP lattice comparison unit 81 then considers the possibility that the current query phoneme was deleted from the annotation. In this case, the DP lattice comparison unit 81 calculates the score update given in equation (4) above which it then accumulates to the score in the source table pointed to by the source index value. The DP lattice comparison unit 81 then propagates the updated score by comparing it with the appropriate entry in the destination table 121-DT. However, in this case, the appropriate entry is not the entry pointed to by the destination index value (DI) since in this case, the current query phoneme was considered to have been deleted from the annotation. Therefore, in this case and as shown in FIG. 11*e*, the DP lattice comparison unit 81 compares the updated score with the score in the destination table 121-DT pointed to by the source index value (SI) and replaces it with the updated score if the updated score is greater.

Figure 11F:
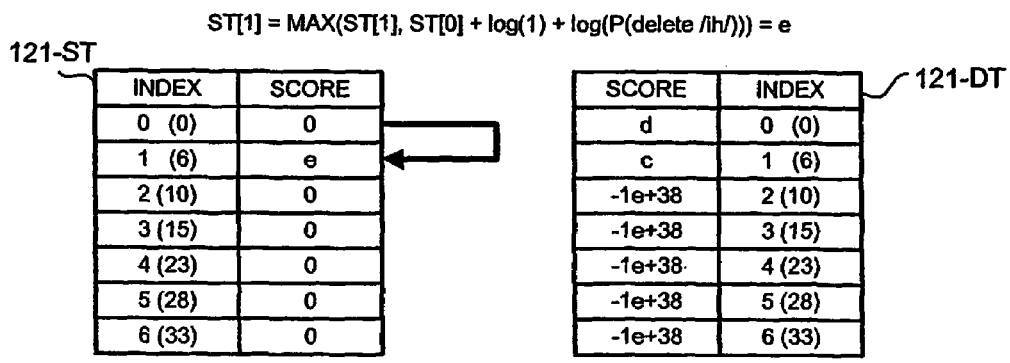
FIG. 11f illustrates the updating of the source table to account for the deletion of a phoneme from the query.

Finally, the DP lattice comparison unit 81 considers the possibility that the annotation phoneme was deleted from the query. In this case, the DP lattice comparison unit 81 calculates the score update given in equation (5) above which it accumulates with the score in the source table pointed to by the source index value. The DP lattice comparison unit 81 then propagates the updated score. However, in this case, since the annotation phoneme has been deleted from the query and as shown in FIG. 11f, the DP lattice comparison unit 81 propagates the updated score by comparing it with the score in the source table pointed to by the destination index value and replaces it with the updated score if the updated score is greater.

Once the DP lattice comparison unit 81 has updated and propagated the scores in the above way for all of the links and nodes in the query and annotation lattices, the DP lattice comparison unit 81 outputs the node table 121-5 associated with the final node 103-5 in the query to the table score processing unit 83. The table score processing unit 83 then inspects the table to determine a score representing the similarity between the query phoneme lattice and the annotation phoneme lattice which it passes back to the control unit 55. As those skilled in the art will appreciate, the $i^{th}$ score in the node table 103-5 passed to the table score processing unit 83 holds the score representing the similarity between the entire query lattice and the portion of the annotation lattice ending at the $i^{th}$ time point in the annotation. For example, the score in the final node table 103-5 at index value 3 (corresponding to annotation node 109-5) represents the score for the similarity between the entire query lattice and the portion of the annotation lattice ending at annotation node 109-5.

As discussed above, there are two different types of phoneme searches which are carried out in this embodiment. The first is when the results of the word search are used to identify portions of the annotations against which at least a part of the query lattice is to be matched. In this case, the entire part of the query lattice is aligned and matched individually with the relevant portions of the annotation lattice. Therefore, in this case, the table score processing unit 83 determines the appropriate score for each portion from the received node table 121, by retrieving the score associated with the last node in the annotation lattice, which it passes back to the control unit 55.

The second type of search is where the entire query is to be compared with different parts of a longer annotation in order to identify places in the annotation that contain the query. In this case, the table score processing unit 83 compares each of the scores in the received node table with a predetermined threshold value and identifies the locations at which the query appears in the annotation by determining which of the scores in the table are greater than the threshold value. For this second type of search, the table score processing unit 83 also determines an approximate start time for where the query appears in the annotation. The way in which the table score processing unit 83 achieves this in this embodiment is illustrated in FIG. 12.

Figure 12:
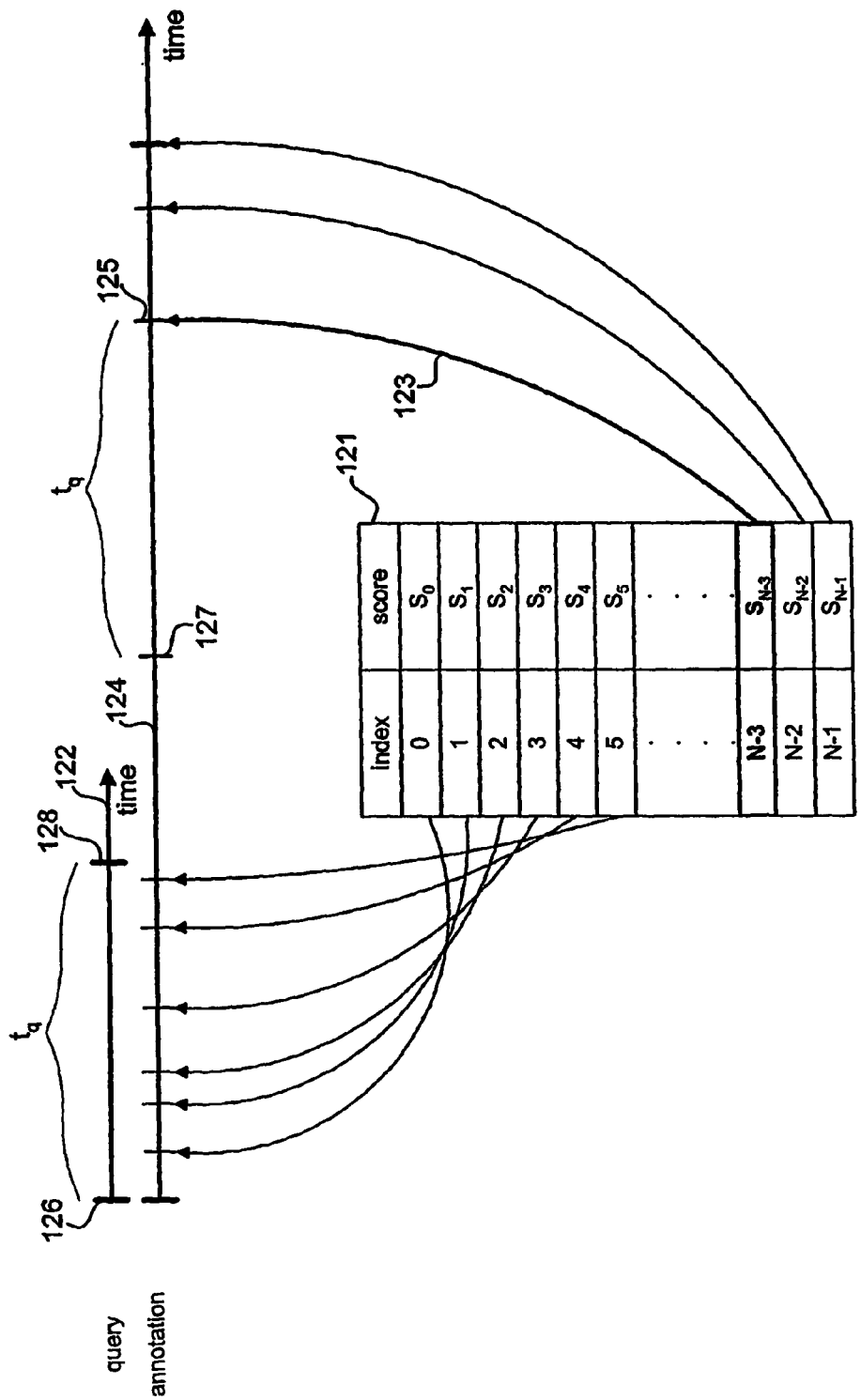
FIG. 12 shows a time line for the query and a time line for the annotation and illustrates the relationship between the scores kept in the node table associated with the last node in the query and the time line associated with the annotation.

In particular, FIG. 12 illustrates two time lines—a first time line 122 corresponding to the query and a second longer time line 124 corresponding to the annotation. The entire query is represented between the two vertical marks 126 and 128 on the time line 122 and has a duration $t_q$. FIG. 12 also illustrates the node table 121 for the last node in the query output by the DP lattice comparison unit 81. As illustrated by the marks along the annotation time line 124 and the arrows coming from the different elements within the node table 121, each score represents the similarity between the entire query lattice and the portion of the annotation ending at the annotation node corresponding to that entry in the node table 121. FIG. 12 also illustrates by the bold arrow 123 that score $S_{N-3}$ is better than the above threshold value and therefore, the table score processing unit 83 determines that the portion of the annotation ending at the corresponding node in the annotation (represented by the mark 125) contains the current query. The table score processing unit 83 then determines an approximate start time (represented by mark 127) of the query within the annotation by subtracting the known query duration ($t_q$) from the time point of the annotation node represented by the mark 125. The table score processing unit 83 then returns the score and the identified start and end times to the control unit 55.

Training

In the above embodiment, the system uses 1892 substitution/deletion probabilities and 43 insertion probabilities which were used to score the dynamic programming paths in the phoneme matching operation. In this embodiment, these probabilities are determined in advance during a training session and are stored in a memory (not shown). In particular, during this training session, a speech recognition system is used to provide a phoneme decoding of speech in two ways. In the first way, the speech recognition system is provided with both the speech and the actual words which are spoken. The speech recognition unit can therefore use this information to generate a canonical phoneme sequence of the spoken words to obtain an ideal decoding of the speech. The speech recognition system is then used to decode the same speech, but this time without knowledge of the actual words spoken (referred to hereinafter as the free decoding). The phoneme sequence generated from the free decoding will differ from the canonical phoneme sequence in the following ways:

i) the free decoding may make mistakes and insert phonemes into the decoding which are not present in the canonical sequence or, alternatively, omit phonemes in the decoding which are present in the canonical sequence;

ii) one phoneme may be confused with another; and iii) even if the speech recognition system decodes the speech perfectly, the free decoding may nonetheless differ from the canonical decoding due to the differences between conversational pronunciation and canonical pronunciation, e.g., in conversational speech the word "and" (whose canonical forms are /ae/ /n/ /d/ and /ax/ /n/ /d/) is frequently reduced to /ax/ /n/ or even /n/.

Therefore, if a large number of utterances are decoded into their canonical forms and their free decoded forms, then a dynamic programming method can be used to align the two. This provides counts of what was decoded, d, when the phoneme should, canonically, have been a p. From these training results, the above substitution, deletion and insertion probabilities can be approximated in the following way.

The probability that phoneme, d, is an insertion is given by:

$$PI(d \mid C) = \frac{I_d}{n_o^d} \quad (6)$$

where $I_d$ is the number of times the automatic speech recognition system inserted phoneme d and $n_o^d$ is the total number of decoded phonemes which are inserted relative to the canonical sequence.

The probability of decoding (substituting) phoneme p as phoneme d is given by:

$$P(d \mid p, C) = \frac{c_{dp}}{n_p} \qquad (7)$$

where $c_{dp}$ is the number of times the automatic speech recognition system decoded d when it should have been p and $n_p$ is the number of times the automatic speech recognition system decoded anything (including a deletion) when it should have been p.

The probability of not decoding anything (i.e. there being a deletion) when the phoneme p should have been decoded is given by:

$$P(\emptyset \mid p, C) = \frac{O_p}{n_p} \qquad (8)$$

where $O_p$ is the number of times the automatic speech recognition system decoded nothing when it should have decoded p and $n_p$ is the same as above.

ALTERNATIVE EMBODIMENTS

As those skilled in the art will appreciate, the above technique for matching one phoneme lattice with another phoneme lattice can be applied to applications other than data retrieval. Additionally, as those skilled in the art will appreciate, although the system described above has used phonemes in the phoneme and word lattice, other phoneme-like units can be used, such as syllables or katakana (Japanese alphabet).

As those skilled in the art will appreciate, the above description of the dynamic programming matching and alignment of the two phoneme lattices was given by way of example only and various modifications can be made. For example, whilst a raster scanning technique for propagating the paths through the lattice points was employed, other techniques could be employed which progressively propagate the paths through the lattice points.

In the above embodiment, the entries in the node table were arranged in time-sequential order relative to the node times of the nodes in the annotation lattice. As those skilled in the art will appreciate, this is not essential, the scores may be stored in any order so long as the comparison unit knows or can determine the order.

In the above embodiment, a separate entry in each node table was provided for each distinct time-point within the annotation. As a result, any nodes in the annotation lattice corresponding to the same time-point were only represented by a single entry in the node table. As those skilled in the art will appreciate, this is not essential—separate entries in the node table may be provided for each of the nodes in the annotation lattice. However, combining the entries for annotation nodes having a common time index reduces the processing burden without affecting performance.

In the above embodiment, a node table was defined for each of the nodes within the query lattice. As those skilled in the art will appreciate, during the propagation of the paths, only two node tables are processed. Therefore, the DP lattice comparison unit may be arranged to only store two node tables in working memory at any time, with the other node tables being stored in some other memory such as a hard disc.

In the above embodiment, separate node tables were provided for each of the nodes in the query lattice. As those skilled in the art will appreciate, the node tables may be combined into a single node table, with each element in the node table being associated with one node in the query lattice and one node (or distinct time-point) in the annotation lattice.

As an alternative to using node tables, a hash table structure could be used. A hash table is a structure that allows for almost direct access with low computational cost. Each element in the hash table is accessed via a hash key. In the present case, the key will be formed using any query node identifier (such as the time-mark associated with the query node) combined with any annotation node identifier. Each element in the hash table then contains some useful information, which in this case corresponds to the score and any other information which may be useful and which has to be provided at the end of the lattice searching process. During the propagation of the scores, the hash element identified by the hash key for the current query node and current annotation node is retrieved from the hash table. If this hash element is defined as HE1, then the system would update the score from HE1 to take into account the above-described substitution, insertions and deletions. Next, the hash element accessed by the key formed with the destination nodes pointed to by the appropriate qlink and alink is retrieved. If this hash element is defined as HE2, then the updated score from HE1 is compared with the score from HE2 and if the updated score from HE1 is better, then the score in HE2 is replaced with the updated score from HE1 in the hash table.

In the above embodiment, during the path propagation, all paths were considered and propagated from each query node to each annotation node. In an alternative embodiment, in order to reduce the number of paths being propagated, a "pruning" technique may be used to stop badly scoring paths propagating further. In this case, when beginning the processing of a node table, the system would query the node table to identify which alinks are active and need to be propagated.

In the above embodiment, the DP lattice comparison unit used a node table for each node in the query lattice. If memory consumption is an issue for the device in which the system is operating, then the memory for each storage area within the node tables can be allocated on the "fly": allocating memory for each node table entry as they are propagated forward, and freeing the memory of the node table entries that will no longer be propagated (since the lattices are directed acyclic graphs). In this case, at one time-point, only the table for the "current query node" and tables for all query nodes that can be reached from that node (via the phoneme links) need to be allocated. As soon as the next query node is being processed, the memory for the current query node can then be freed.

In the above embodiment, when the phonemes in the query lattice are compared with the phonemes in the annotation lattice, the above-described confusion probabilities and the automatic speech recognition unit's confidence data are combined to generate a score update using equations (1) to (5) above. In the above embodiment, these confusion probabilities were combined with equal weighting to the automatic speech recognition unit confidence probabilities. However, as those skilled in the art will appreciate, the above-described updating may be performed using only the above-described confusion or confidence data. Similarly, if the two sources of probabilities are to be combined, then they can be combined through an appropriate weighting factor. For example, if the confidence probability from the automatic speech recognition unit is high, then more weighting may be given to the confidence probabilities. Whereas if the confidence probability from the automatic speech recognition unit is low, then more weight may be given to the confusion probabilities.

The inventor has also found that during the stage of creating the lattices, penalizing insertions while allowing more deletions results in smaller lattices which reduces the computational effort required to carry out a search, whilst not significantly affecting the effectiveness of the search.

Although not described above, in the above embodiment, the silence phoneme (SIL) is treated as any other phoneme, but ignored when being compared during the dynamic programming searching operation, by propagating the scores over the silence arc without altering its score.

In the above embodiment, pictures were annotated using the phoneme and word lattice annotation data. As those skilled in the art will appreciate, this phoneme and word lattice data can be used to annotate many different types of data files. For example, this kind of annotation data can be used in medical applications for annotating x-rays of patients, 3D videos of, for example, NMR scans, ultrasound scans etc. It can also be used to annotate 1D data, such as audio data. For example, the annotation data may be used to annotate the titles or lyrics of music stored in a music library. In this case, the user can input a spoken query to try to retrieve a music title to be played. Further, in such an embodiment, instead of outputting the search results on a display, the results may be output acoustically via a loudspeaker. For example, the music titles or a part of the music may be played to the user via a loudspeaker.

In the above embodiments, during the dynamic programming path propagation, the updated scores from the source table were compared with the appropriate scores in the destination table and the maximum score was stored. As those skilled in the art will appreciate, since the purpose of the comparison technique is to generate a score representing the similarity between the query and the portion of the annotation, it is not essential to compare and store the maximum of the two scores. Instead, the two scores may simply be added together. As long as the same summation is being performed when comparing the query with other portions of the annotation or with other annotations, a relative comparison of the different scores can still be made to identify the similarity between the query and each annotation portion or between the query and each annotation.

In the above embodiment, when a query is compared with a longer annotation in order to try to find one or more locations corresponding to the query, the scores in the node table associated with the end node in the query was compared with a threshold value. Alternatively, the scores in the node table associated with the end node in the query may simply be ranked based on the scores, with the N-best scores being used to identify the places in the annotation most likely to correspond to the query. These N-best scores for the current annotation can then be returned to the control unit which can then again rank the scores from the different annotations to identify the M-best annotations most likely to contain or correspond to the query. These M-best "hits" can then be output to the user for the user to select the appropriate annotation or data file.

In the above embodiments, a speech recognition system which generates a sequence of phonemes from the input speech signal was used. As those skilled in the art will appreciate, the above system can be used with other types of speech recognition systems which generate, for example, a sequence of output words or a word lattice which can then be decomposed into a corresponding phoneme lattice with alternatives, in order to simulate a recogniser which produces phoneme strings.

In the above embodiment, the insertion, deletion and decoding (substitution) probabilities were calculated from the confusion statistics for the speech recognition system using a maximum likelihood estimate of the probabilities. As those skilled in the art of statistics will appreciate, other techniques, such as maximum entropy techniques, can be used to estimate these probabilities.

Figure 13:
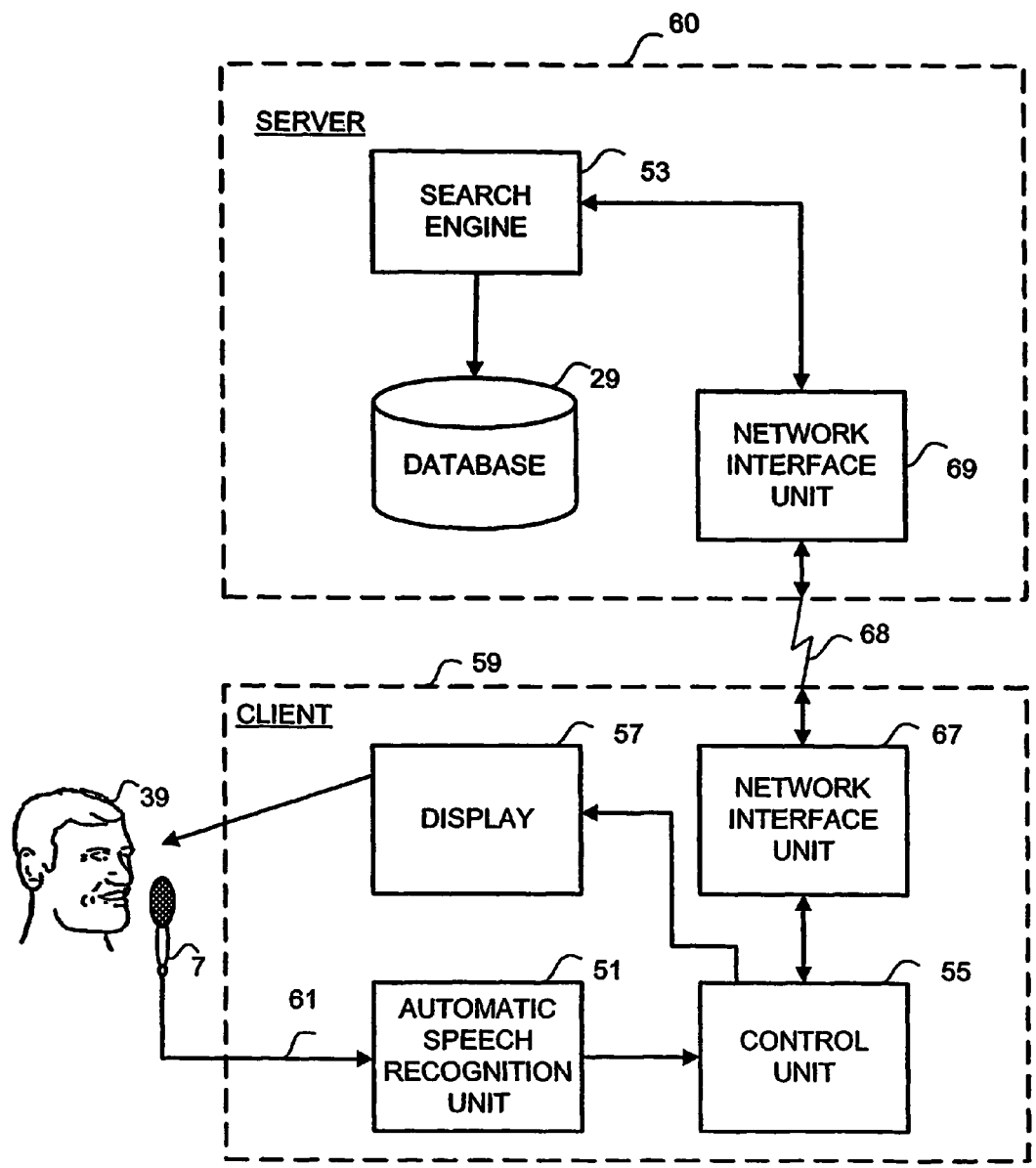
FIG. 13 is a schematic block diagram illustrating the form of an alternative user terminal which is operable to retrieve a data file from a database located within a remote server in response to an input voice query.

In the above embodiment, the database 29 and the automatic speech recognition unit 51 were both located within the user terminal 59. As those skilled in the art will appreciate, this is not essential. FIG. 13 illustrates an embodiment in which the database 29 and the search engine 53 are located in a remote server 60 and in which the user terminal 59 accesses the database 29 via the network interface units 67 and 69 and a data network 68 (such as the Internet). In this embodiment, the user terminal 59 can only receive voice queries from the microphone 7. These queries are converted into phoneme and word data by the automatic speech recognition unit 51. This data is then passed to the control unit 55 which controls the transmission of the data over the data network 68 to the search engine 53 located within the remote server 60. The search engine 53 then carries out the search in a similar manner to the way in which the search was performed in the above embodiment. The results of the search are then transmitted back from the search engine 53 to the control unit 55 via the data network 68. The control unit 55 then considers the search results received back from the network and displays appropriate data on the display 57 for viewing by the user 39.

Figure 14:
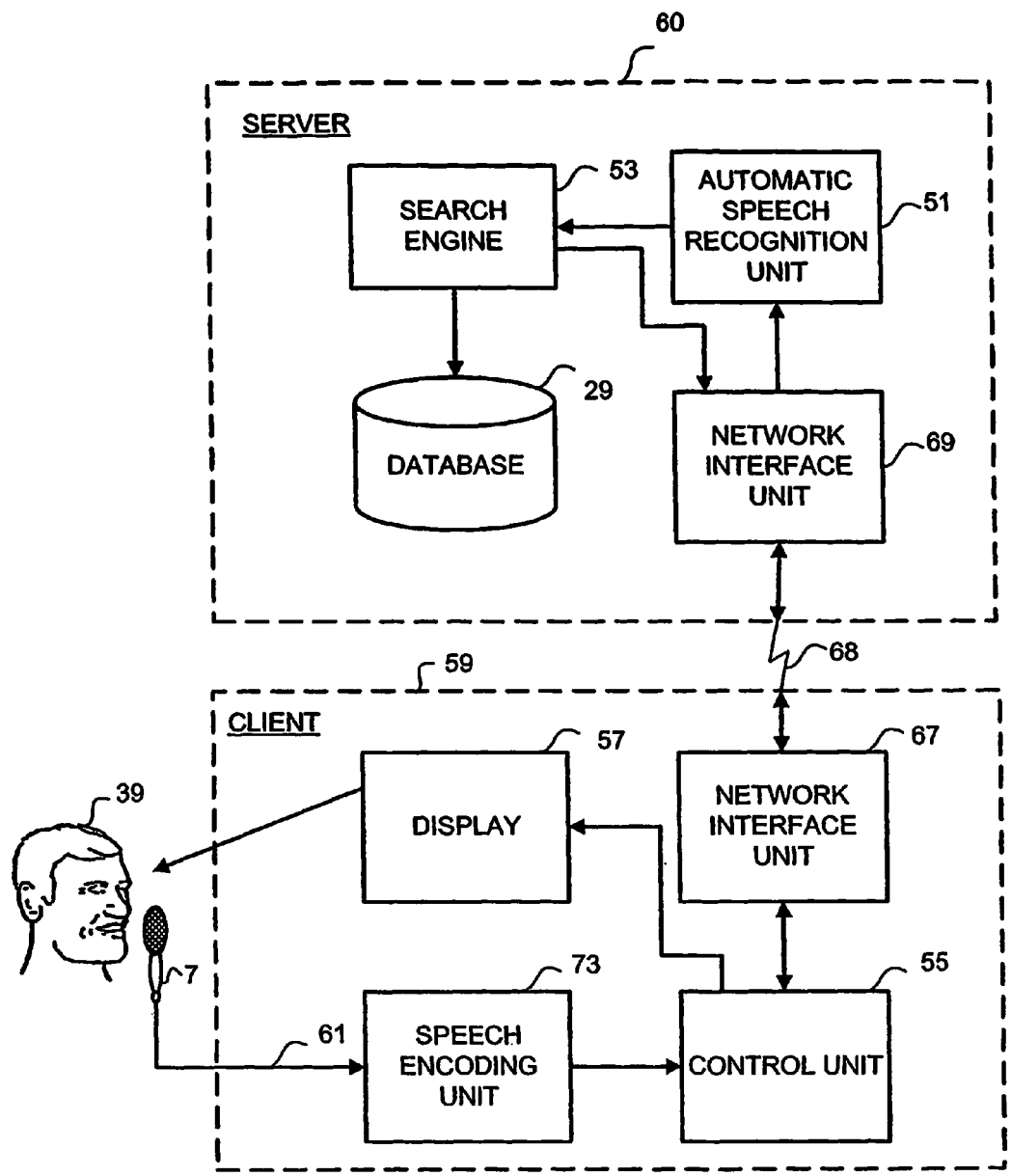
FIG. 14 illustrates another user terminal which allows the user to retrieve data from a database located within a remote server in response to an input voice query.

In addition to locating the database 29 and the search engine 53 in the remote server 60, it is also possible to locate the automatic speech recognition unit 51 in the remote server 60. Such an embodiment is shown in FIG. 14. As shown, in this embodiment, the input voice query from the user is passed via input line 61 to a speech encoding unit 73 which is operable to encode the speech for efficient transfer through the data network 68. The encoded data is then passed to the control unit 55 which transmits the data over the network 68 to the remote server 60, where it is processed by the automatic speech recognition unit 51. The phoneme and word data generated by the speech recognition unit 51 for the input query is then passed to the search engine 53 for use in searching the database 29. The search results generated by the search engine 53 are then passed, via the network interface 69 and the network 68, back to the user terminal 59. The search results received back from the remote server are then passed via the network interface unit 67 to the control unit 55 which analyses the results and generates and displays appropriate data on the display 57 for viewing by the user 39.

In a similar manner, a user terminal 59 may be provided which only allows typed inputs from the user and which has the search engine and the database located in the remote server. In such an embodiment, the phonetic transcription unit 75 may be located in the remote server 60 as well.

In the above embodiments, a dynamic programming algorithm was used to align the query phoneme lattice with the annotation phoneme lattice. As those skilled in the art will appreciate, any alignment technique could be used. For example, a naive technique could be used which identifies all possible alignments. However, dynamic programming is preferred because of its ease of implementation using standard processing hardware.

In the above embodiment, the same phoneme confusion probabilities were used for both the annotations and the queries. As those skilled in the art will appreciate, if different recognition systems are used to generate these, then different phoneme confusion probabilities should be used for the annotations and the queries. Since these confusion probabilities depend upon the recognition system that was used to generate the phoneme sequences.

In the above embodiment, when either the annotation or the query was generated from text, it was assumed that the canonical sequence of phonemes corresponding to the typed text was correct. This may not be the case since this assumes that the typed word or words are not mis-spelled or mis-typed. Therefore, in an alternative embodiment, confusion probabilities may also be used for typed queries and/or annotations. The confusion probabilities used may try to codify either or both mis-spellings and mis-typings. As those skilled in the art will appreciate, the confusion probabilities for mis-typings will depend upon the type of keyboard used. In particular, the confusion probabilities of mis-typing a word will depend upon the layout of the keyboard. For example, if a letter "d" is typed then the keys surrounding the key for the letter "d" will have high mis-typing probabilities whereas those located further away from the "d" key will have lower mis-typing probabilities. As mentioned above, these mis-typing probabilities may be used together with or replaced by confusion probabilities for the mis-spelling of the words. These mis-spelling probabilities may be determined by analyzing typed documents from a large number of different users and monitoring the type of mis-spellings which usually occur. Such mis-spelling probabilities may also take into account transcription errors caused by mis-keying. In such an embodiment, the dynamic programming constraints used should allow for insertions and/or deletions in the typed input. For example, the constraints illustrated in FIG. 11 could be used.

A further alternative is where the text is input via a keyboard which assigns more than one character to each key (such as the keyboard of a mobile phone), where the user must repeatedly press each key to cycle through the characters assigned to that key. In such an embodiment, the confusion probabilities would be adjusted so that characters assigned to the same key as the input character would have higher mis-typing confusion probabilities than those associated with the other keys. This is because, as anyone who has used a mobile phone to send a text message will appreciate, mis-typings often occur because the key has not been pressed the correct number of times to input the desired character.

In the above embodiments, the labels of the annotation and the query which have been aligned and matched have represented units of speech. As those skilled in the art will appreciate, the above-described technique can be used in other applications where the labels of the query and the annotation may be confusable due to the inaccuracies of a recognition system which generated the sequences of features. For example, the above technique could be used in optical character or handwriting recognition systems or in DNA recognition systems, where there is a likelihood that the recognition system might mistake one label for another.

A number of embodiments and modifications have been described above. As those skilled in the art will appreciate, there are many other embodiments and modifications which will be apparent to those skilled in the art.

The invention claimed is:

1. A method of searching a database comprising a plurality of information entries to identify stored image data to be retrieved therefrom, each of said plurality of information entries having an associated annotation lattice, the method comprising:

using a user terminal to receive a query lattice representing an input query;

comparing the query lattice with each annotation lattice to provide a set of comparison results;

identifying stored image data to be retrieved from said database using the set of comparison results; and displaying said stored image data retrieved from said database on a display of the user terminal;

wherein the query lattice and each annotation lattice define alternative label sequences that represent a sequential signal, and each lattice comprises a plurality of nodes each associated with one or more labels and representing a point in the sequential signal at which the associated label occurs, wherein the query lattice is compared with each annotation lattice by propagating a plurality of paths, each path representing a comparison between labels in the query lattice and labels in the annotation lattice, and each path having an associated accumulative value representing the closeness of the comparison, wherein during the path propagation, said comparing step defines, for each node in the query lattice, a plurality of associated storage areas in a memory, each storage area associated with a query lattice node also being associated with a respective node in the annotation lattice and being operable to store, during the path propagation, an accumulative value representing the closeness of the comparison between labels in the query lattice up to the associated query lattice node and labels in the annotation lattice up to the associated annotation lattice node, wherein said comparing step uses said storage areas during the propagation of said paths, and wherein when propagating a path from a source node in said query lattice to a destination node in said query lattice, said comparing step updates and propagates accumulative values stored in the storage areas associated with the source node to at least the storage areas associated with the destination node.

2. A method according to claim 1, wherein during the propagation of said accumulative values, said comparing step compares the appropriate accumulative value in the storage area associated with the destination node with the updated accumulative value from the storage area associated with the source node.

3. A method according to claim 1, wherein said comparing step updates the accumulative values stored in the storage areas associated with the source node to take into account for substitution of the corresponding labels in the query lattice and the corresponding labels in the annotation lattice.

4. A method according to claim 1, wherein said comparing step updates the accumulative value stored in the storage areas associated with the source node to take into account the substitution, insertion and deletion of labels from the query lattice and/or annotation lattice and wherein the storage area to which an updated score is propagated depends upon whether a label is substituted, inserted or deleted from the query lattice and/or the annotation lattice.

5. A method according to claim 1, wherein said comparing step updates the accumulative values stored in the storage areas associated with the source node by comparing the corresponding labels in the query lattice with the corresponding labels in the annotation lattice.

6. A method according to claim 1, wherein said query lattice is generated by a recognition unit and includes confidence data associated with said labels indicative of the confidence that said recognition unit correctly recognized the label and wherein said comparing step updates said accumulative values stored in the storage areas associated with the source node using the confidence data from the corresponding labels.

7. A method according to claim 1, wherein the storage areas associated with nodes in the query lattice are stored in a plurality of node tables, and each of the storage areas associated with a node in the query lattice are stored in a node table associated with the respective query lattice node.

8. A method according to claim 2, wherein said comparing step replaces the accumulative value in the storage area associated with the destination node with the updated accumulative value from the storage area associated with the source node if the updated accumulative value is better than the accumulative value stored in the storage area associated with the destination node.

9. A method according to claim 5, wherein said comparing step updates said accumulative values by using predetermined confusion data which defines measures of confusability between the different labels.

10. A method according to claim 6, wherein both said query and annotation lattices include said confidence data and wherein said comparing step updates said accumulative values using the confidence data for the respective labels from the query and annotation lattices.

11. A method of searching a database comprising a plurality of information entries to identify stored image data to be retrieved therefrom, each of said plurality of information entries having an associated annotation lattice, the method comprising:
using a user terminal to receive a query lattice representing an input query;
comparing the query lattice with each annotation lattice to provide a set of comparison results;
identifying stored image data to be retrieved from said database using the set of comparison results; and
displaying said stored image data retrieved from said database on a display of the user terminal;
wherein the query lattice and each annotation lattice define alternative label sequences that represent a sequential signal, and each lattice comprises a plurality of nodes each associated with one or more labels and representing a point in the sequential signal at which the associated label occurs,
wherein the query lattice is compared with each annotation lattice by propagating a plurality of paths, each path representing a comparison between labels in the query lattice and labels in the annotation lattice, and each path having an associated accumulative value representing the closeness of the comparison,
wherein during the path propagation, said comparing step defines, for each node in the query lattice, a plurality of associated storage areas in a memory, each storage area associated with a query lattice node also being associated with a respective node in the annotation lattice and being operable to store, during the path propagation, an accumulative value representing the closeness of the comparison between labels in the query lattice up to the associated query lattice node and labels in the annotation lattice up to the associated annotation lattice node,
wherein said comparing step uses said storage areas during the propagation of said paths,
wherein the method further comprises a processing step of processing accumulative values stored for a node to determine a similarity measure representing the similarity between the query and annotation lattices, and
wherein the annotation lattice represents a longer sequence than the query lattice and wherein the processing step processes the accumulative values stored for the node to determine if the annotation lattice includes one or more portions similar to the query lattice.

12. A method according to claim 11, wherein said processing step compares the accumulative values in the storage areas of the node to identify values better than a predetermined threshold, to identify said one or more portions in the annotation lattice which are similar to the fist lattice.

13. A method according to claim 12, wherein said processing step identifies said one or more portions by identifying the storage areas having an accumulative value better than said threshold.

14. A method according to claim 12 or 13, wherein the sequence length of the query lattice is known, wherein when said processing step identifies an accumulative value better than said threshold, the annotation lattice node associated with the identified accumulative value represents the end of said portion corresponding to said query lattice and wherein said processing step estimates a beginning of the portion within the annotation lattice using the known sequence length of the query lattice.

15. An apparatus for searching a database comprising a plurality of information entries to identify stored image data to be retrieved therefrom, each of said plurality of information entries having an associated annotation lattice, the apparatus comprising:
a memory;
a receiver operable to receive a query lattice representing an input query;
a lattice comparison apparatus for comparing the query lattice with each annotation lattice to provide a set of comparison results;
an identifier operable to identify stored image data to be retrieved from said database using the set of comparison results provided by the lattice comparison apparatus; and
a display operable to display said stored image data identified by the identifier and retrieved from said database;
wherein the query lattice and each annotation lattice define alternative label sequences that represent a sequential signal, and each lattice comprises a plurality of nodes each associated with one or more labels and representing a point in the sequential signal at which the associated label occurs,
wherein the query lattice is compared with each annotation lattice by propagating a plurality of paths, each path representing a comparison between labels in the query lattice and labels in the annotation lattice, and each path having an associated accumulative value representing the closeness of the comparison,
wherein during the path propagation, said lattice comparison apparatus is operable to define, for each node in the query lattice, a plurality of associated storage areas in said memory, each storage area associated with a query lattice node also being associated with a respective node in the annotation lattice and being operable to store, during the path propagation, an accumulative value representing the closeness of the comparison between labels in the query lattice up to the associated query lattice node and labels in the annotation lattice up to the associated annotation lattice node,
wherein said lattice comparison apparatus is operable to use said storage areas during the propagation of said paths,
wherein when propagating a path from a source node in said query lattice to a destination node in said query lattice, said lattice comparison apparatus is operable to update and to propagate accumulative values stored in the storage areas associated with the source node to at least the storage areas associated with the destination node.

16. An apparatus according to claim 15, wherein during the propagation of said accumulative values, said lattice comparison apparatus is operable to compare the appropriate accumulative value in the storage area associated with the destination node with the updated accumulative value from the storage area associated with the source node.

17. An apparatus according to claim 15, wherein said lattice comparison apparatus is operable to update the accumulative values stored in the storage areas associated with the source node to take into account for substitution of the corresponding labels in the query lattice and the corresponding labels in the annotation lattice.

18. An apparatus according to claim 15, wherein said lattice comparison apparatus is operable to update the accumulative value stored in the storage areas associated with the source node to take into account the substitution, insertion and deletion of labels from the query lattice and/or annotation lattice and wherein the storage area to which an updated score is propagated depends upon whether a label is substituted, inserted or deleted from the query lattice and/or the annotation lattice.

19. An apparatus according to claim 15, wherein said lattice comparison apparatus is operable to update the accumulative values stored in the storage areas associated with the source node by comparing the corresponding labels in the query lattice with the corresponding labels in the annotation lattice.

20. An apparatus according to claim 15, wherein said query lattice is generated by a recognition unit and includes confidence data associated with said labels indicative of the confidence that said recognition unit correctly recognized the label and wherein said lattice comparison apparatus is operable to update said accumulative values stored in the storage areas associated with the source node using the confidence data for the corresponding labels.

21. An apparatus according to claim 15, wherein the storage areas associated with nodes in the query lattice are stored in a plurality of node tables, and each of the storage areas associated with a node in the query lattice are stored in a node table associated with the respective query lattice node.

22. An apparatus according to claim 15, wherein said set of comparison results includes at least one score representing the similarity between the query lattice and each annotation lattice and wherein said identifier is operable to identify the N most relevant information entries by ranking the scores within said set of comparison results to identify the N-best scores.

23. An apparatus according to claim 16, wherein said lattice comparison apparatus is operable to replace the accumulative value in the storage area associated with the destination node with the updated accumulative value from the storage area associated with the source node if the updated accumulative value is better than the accumulative value stored in the storage area associated with the destination node.

24. An apparatus according to claim 19, wherein said lattice comparison apparatus is operable to update said accumulative values by using predetermined confusion data which defines measures of confusability between the different labels.

25. An apparatus according to claim 20, wherein both said query and annotation lattices include said confidence data and wherein said lattice comparison apparatus is operable to update said accumulative values using the confidence data for the respective labels from the query and annotation lattices.

26. An apparatus according to claim 21, wherein said storage areas in said node tables are arranged in a sequential order defined by the sequential order of the associated nodes.

27. An apparatus for searching a database comprising a plurality of information entries to identify stored image data to be retrieved therefrom, each of said plurality of information entries having an associated annotation lattice, the apparatus comprising:
a memory;
a receiver operable to receive a query lattice representing an input query;
a lattice comparison apparatus for comparing the query lattice with each annotation lattice to provide a set of comparison results;
an identifier operable to identify stored image data to be retrieved from said database using the set of comparison results provided by the lattice comparison apparatus; and
a display operable to display said stored image data identified by the identifier and retrieved from said database;
wherein the query lattice and each annotation lattice define alternative label sequences that represent a sequential signal, and each lattice comprises a plurality nodes each associated with one or more labels and representing a point in the sequential signal at which the associated label occurs,
wherein the query lattice is compared with each annotation lattice by propagating a plurality of paths, each path representing a comparison between labels in the query lattice and labels in the annotation lattice, and each path having an associated accumulative value representing the closeness of the comparison,
wherein during the path propagation, said lattice comparison apparatus is operable to define, for each node in the query lattice, a plurality of associated storage areas in said memory, each storage area associated with a query lattice node also being associated with a respective node in the annotation lattice and being operable to store, during the path propagation, an accumulative value representing the closeness of the comparison between labels in the query lattice up to the associated query lattice node and labels in the annotation lattice up to the associated annotation lattice node,
wherein said lattice comparison apparatus is operable to use said storage areas during the propagation of said paths,
wherein the apparatus further comprises a processor operable to process the accumulative values stored for a node to determine a similarity measure representing the similarity between the query and annotation lattices, and
wherein the annotation lattice represents a longer sequence than the query lattice and wherein the processor is operable to process the accumulative values stored for the node to determine if the annotation lattice includes one or more portions similar to the query lattice.

28. An apparatus according to claim 27, wherein said processor is operable to compare the accumulative values in the storage areas of the node to identify values better than a predetermined threshold, to identify said one or more portions in the annotation lattice which are similar to the query lattice.

29. An apparatus according to claim 28, wherein said processor is operable to identify said one or more portions by identifying the storage areas having an accumulative value better than said threshold.

30. An apparatus according to claim 28, wherein the sequence length of the query lattice is known, wherein when said processor identifies an accumulative value better than said threshold, the annotation lattice node associated with the identified accumulative value represents the end of the said portion corresponding to said query lattice and wherein said processor is operable to estimate a beginning of the portion within the annotation lattice using the known sequence length of the query lattice.

31. A method according to claim 7, wherein said storage areas in said node tables are arranged in a sequential order defined by the sequential order of the associated nodes.

* * * * *